(12) United States Patent
Sorgius

(10) Patent No.: US 7,986,446 B2
(45) Date of Patent: Jul. 26, 2011

(54) METHOD AND DEVICE FOR DOCUMENT SCANNING WITH LINE CAMERA

(75) Inventor: Helmut Sorgius, Constance (DE)

(73) Assignee: Chromasens GmbH, Constance (DE)

( * ) Notice: Subject to any disclaimer, the term of this patent is extended or adjusted under 35 U.S.C. 154(b) by 964 days.

(21) Appl. No.: 11/845,647

(22) Filed: Aug. 27, 2007

(65) Prior Publication Data

US 2008/0055673 A1    Mar. 6, 2008

(30) Foreign Application Priority Data

Sep. 4, 2006   (DE) .......................... 10 2006 041 462

(51) Int. Cl.
    *H04N 1/04* (2006.01)
(52) U.S. Cl. ......... 358/474; 358/505; 358/518; 348/142
(58) Field of Classification Search .................. 358/474, 358/505, 486, 497, 488, 518; 348/142
    See application file for complete search history.

(56) References Cited

U.S. PATENT DOCUMENTS

| | | | | |
|---|---|---|---|---|
| 5,539,532 A | * | 7/1996 | Watanabe | 358/443 |
| 5,761,070 A | * | 6/1998 | Conners et al. | 700/223 |
| 7,564,597 B2 | * | 7/2009 | Chueh | 358/474 |
| 7,656,565 B2 | * | 2/2010 | Rhoads | 358/497 |
| 2001/0008580 A1 | * | 7/2001 | Sensui | 396/114 |
| 2002/0039187 A1 | * | 4/2002 | Keranen | 356/604 |
| 2002/0113194 A1 | * | 8/2002 | Hu et al. | 250/208.1 |
| 2003/0025953 A1 | * | 2/2003 | Chang et al. | 358/518 |
| 2005/0018254 A1 | * | 1/2005 | Chueh | 358/497 |
| 2005/0212970 A1 | | 9/2005 | Joskin | |
| 2005/0257907 A1 | * | 11/2005 | Dougherty et al. | 162/135 |
| 2006/0232702 A1 | | 10/2006 | Joskin et al. | |
| 2007/0109562 A1 | * | 5/2007 | Nagatani | 358/1.6 |
| 2008/0024837 A1 | * | 1/2008 | Hayakawa et al. | 358/497 |

FOREIGN PATENT DOCUMENTS

| | | |
|---|---|---|
| DE | 10 2004 050 422 A1 | 6/2005 |
| DE | 10 2005 013 850 A1 | 10/2005 |
| JP | 62055777 A | 11/1987 |
| JP | 06038028 A | 10/1994 |

OTHER PUBLICATIONS

Patent Abstracts of Japan, JP 62055777A, English translation of Abstract.
Patent Abstracts of Japan, JP06038028, English translation of Abstract.

* cited by examiner

*Primary Examiner* — Negussie Worku
(74) *Attorney, Agent, or Firm* — Houston Eliseeva LLP

(57) ABSTRACT

A method and a device for the optical scanning of a document by means of a line camera in which the document may be scanned at variable speed. Since on the one hand a line frequency by which the individual lines are scanned is based on the speed of movement, and on the other hand binning is carried out automatically on the basis of the speed of movement, wherein the line frequency is multiplied by a binning factor n, it is possible for a document to be scanned very easily and simply over a wide speed range. Color values are preferably corrected by means of an amplification factor, so that the brightness of the images produced by this means is constant over the whole speed range.

41 Claims, 7 Drawing Sheets

METHOD AND DEVICE FOR DOCUMENT SCANNING WITH LINE CAMERA

RELATED APPLICATIONS

This application claims priority to German Patent Application No. DE 10 2006 041 462.4 filed on Sep. 4, 2006, which is incorporated herein by reference in its entirety.

BACKGROUND OF THE INVENTION

Line cameras are generally used for the optical scanning of a document in a scanner. The line camera and the document are moved relative to one another, so that the surface of the document to be scanned is covered completely by the line camera.

Such line cameras are also often used in industrial applications to scan along predetermined paths of products being made. Often this involves automatic quality assurance with the aid of the images taken by the camera. These products may be e.g. paper printed by high-speed printers, or other machine-made web-like products.

In the starting and stopping of such production webs, they are slowly accelerated or decelerated. Proper monitoring of the products should also be possible during the acceleration and deceleration phases.

In conventional methods, an encoder is used to generate a clock signal proportional to the speed of the web, and the line frequency of the line camera is controlled on the basis of this signal.

The line cameras have charge coupled devices (CCDs), the exposure time of which can generally not be actively controlled. The exposure time of the CCD therefore corresponds to the time interval between two scans, less a predetermined duration of time required to read out the CCD. As a result of this, with lower line frequency, the exposure time of the CCD increases, with a consequent and corresponding increase in image brightness. At low line frequencies this can also lead to the CCD becoming completely saturated, so that image generation is no longer possible. A method of this kind permits only limited variations in speed.

Also known are CCDs with electronic shutters on the individual sensor elements. With these, the exposure time may be controlled actively, and the speed-related differences in brightness can be avoided. Such CCDs with electronic shutters are however very sluggish, and for a high-speed line camera they are not available.

In order to reduce these problems, a completely new approach to the optical scanning of a document has been proposed in DE 10 2004 050 422 A1 (see also, US 2006/0232702 A1). Here the camera is operated at a line frequency which is independent of the relative speed of movement between the camera and the document. The relative speed of movement between the camera and the document is recorded and, depending on this movement, the camera signals are completely scanned afresh, in order to generate an output image with a predetermined output resolution. In the course of this rescanning it is necessary to interpolate the camera signals, so that on the one hand some information is lost, while on the other hand the sharpness of the image is impaired.

A further development of this known method is described in DE 10 2005 013 850 A1 (see also US 2005/0212970 A1). Here the raw signals from the camera are converted by one or more analog/digital converters, and rescanned in accordance with the method described above. Apart from the reduction in quality of the output image, a disadvantage is that considerable computing power is required to implement this method, so that a computer or other logic circuit (e.g. field programmable gate array (FPGA)) with a suitably high capacity must be provided.

JP 62-55777 A discloses a method for the optical scanning of a document using a camera. During scanning, the document is moved at a speed of movement which is detected by a rotary coder. The line frequency of the line camera is set so that the resolution of the transmitted image remains the same even at varying speeds. Since image brightness is proportional to the integration time of the sensor, it is in inverse proportion to the speed. Fluctuations in speed may therefore be regarded as fluctuations in image brightness.

JP 6-38028 A shows a scanner which is able to scan a document at various reduced sizes. In this case, the line frequency of the image sensor is held constant, and the speed is varied according to the scale of reduction or enlargement. The smaller the chosen scale, the greater the speed that must be set. For a very large reduction, the color values of two adjacent lines may be added together, in which case these two lines are output as a single line. This further reduces the number of lines and the resolution, so that the actual scanning speed may be further reduced.

SUMMARY OF THE INVENTION

The invention relates to a method and a device for the optical scanning of a document by means of a line camera which, during scanning, is moved in a predetermined direction of movement relative to the document.

The invention can be used to address the problem of optical scanning of a document by means of a line camera which, during scanning, may be moved relative to the document at varying speeds over a wide speed range. At the same time, the method can be simple enough to be implemented within a camera module with minimum use of hardware. The invention can also be relevant to the problem of creating a device for carrying out the method according to the invention.

In general, according to one aspect, the invention features a method for the optical scanning of a document by means of a line camera which, during scanning, is moved relative to the document at a speed of movement ($v_t$), wherein during scanning at a predetermined nominal speed ($v_N$) and a predetermined nominal line frequency ($F_N$) an image with a nominal resolution is generated. The scanning of the document is effected at a variable speed of movement wherein a line frequency at which in each case individual lines are scanned is changed in proportion to the speed of movement and when the speed of movement is reduced by a predetermined amount relative to the nominal speed, color values of several lines are in each case averaged to give one color value (binning) and the line frequency (F) is proportional to the product of speed of movement ($v_t$) and the number (n) of color values to be averaged, so that even at reduced speed an image with nominal resolution is generated. Further, depending on the speed of movement, the number (n) of color values to be averaged in each case is changed automatically.

In general, according to one aspect, the invention also features a device for the optical scanning of a device by means of a line camera, comprising a sensor unit with a CCD and a lens, an input control element with an input for the connection of an encoder by which the relative speed between the line camera and the document to be scanned is detected, and a signal processor. The input control element and the signal processor are designed to execute optical scanning of a document by means of a line camera which, during scanning, is moved relative to the document at a speed of movement ($v_t$), wherein during scanning at a predetermined nominal speed ($v_N$) and a predetermined nominal line frequency ($F_N$) an image with a nominal resolution is generated. The scanning of the document is effected at a variable speed of movement wherein a line frequency at which in each case individual lines are scanned is changed in proportion to the speed of movement and when the speed of movement is reduced by a predetermined amount relative to the nominal speed, color values of several lines are in each case averaged to give one color value (binning) and the line frequency (F) is proportional to the product of speed of movement ($v_t$) and the number (n) of color values to be averaged, so that even at reduced speed an image with nominal resolution is generated. Depending on the speed of movement, the number (n) of color values to be averaged in each case is changed automatically.

With the method according to an aspect of the invention, a document is scanned by a line camera, with the line camera being moved in a predetermined direction of movement relative to the document. In scanning at a nominal speed $v_N$, an image is produced at a nominal resolution. Scanning of the document is effected at a variable speed of movement, while a line frequency used for scanning individual lines is varied in proportion to the speed of movement. In the case of a speed of movement $v_t$ reduced from the nominal speed by at least a certain amount, color values of several lines consecutive in the direction of movement are in each case averaged to give one color value, and the number of averaged color values is set so that even at reduced speed an image with nominal resolution is produced. According to the invention, the number of color values to be averaged in each case is varied automatically depending on the speed of movement. This number of color values is described as the binning factor n. By this means it is possible to obtain correct images of the document at the desired nominal resolution over a wide speed range.

A color value indicates the intensity of the image point concerned. A color value may also be a shade of grey, if the CCD detects grey levels. A color value may however also be a color separation value, if the CCD detects color intensities of individual colors.

In an advantageous development of the invention, the color values detected by the line camera are amplified by an amplification factor g, which is indirectly proportional to the speed of movement within the speed range in which in each case a specific number of color values are averaged.

Through the use of the amplification factor, the image brightness of the images may be held constant over a wide range. By this means it is possible to widen the speed ranges, described below as binning ranges, in which in each case a predetermined number of color values is averaged. In this way it is therefore possible to cover an even wider speed range, while the brightness of the images may be held constant over the entire speed range.

This method is very easy to implement in a camera module of a line camera, since conventional camera modules are often already provided with a binning function, although in conventional camera modules this is not automatically adaptable to the speed of movement.

The combination of automatic binning and automatic adjustment of brightness by means of the amplification factor allows speed variations up to a factor of 1024 without the use of large computing or logic capacity.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
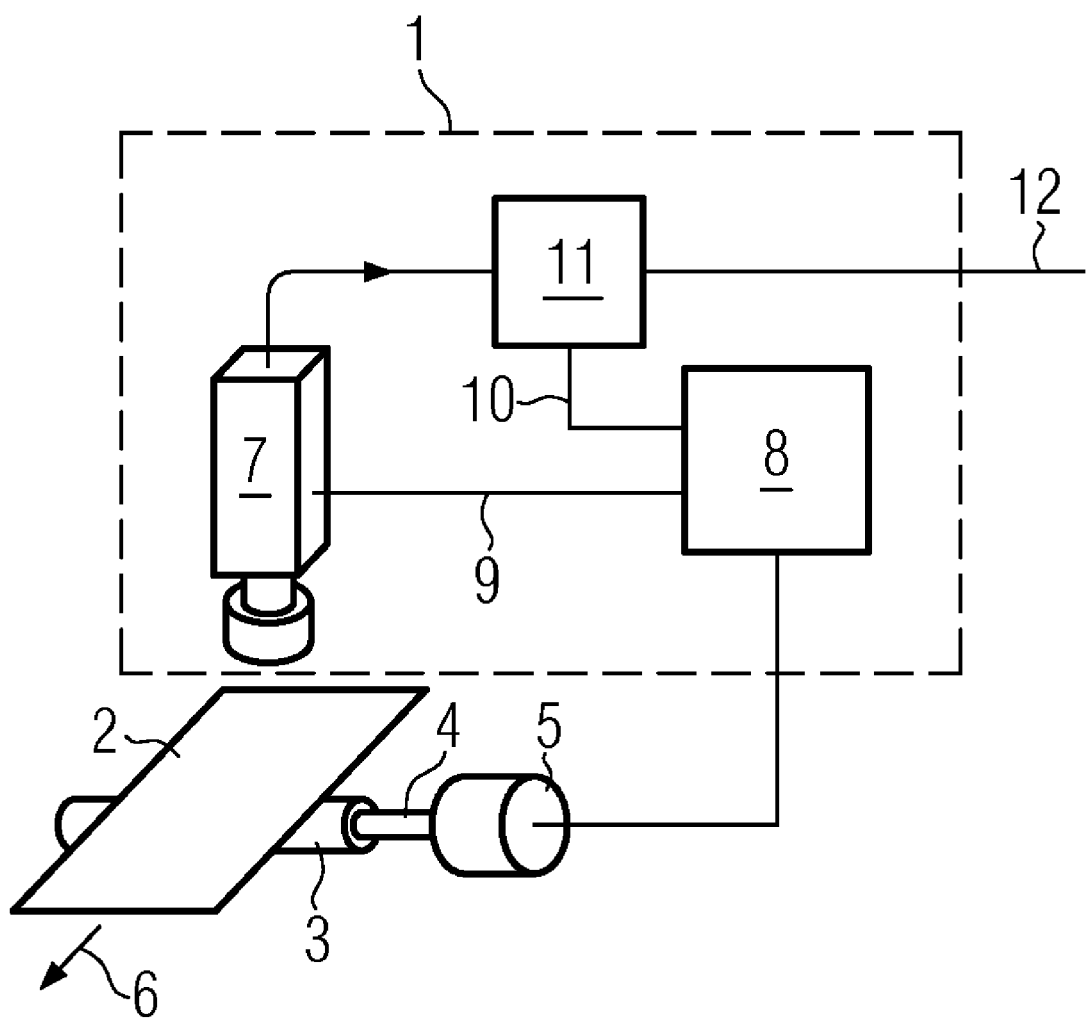
FIG. 1 is a schematic view of a camera module for scanning a product web moved along the camera.

The invention is explained below by way of example and with the aid of the drawing.

FIG. 1 shows a camera module 1 constructed according to the principles of the invention for the scanning of a product web 2. The product web 2 is moved by rollers 3 along the camera module 1. The purpose of the camera module 1 is to monitor the optical quality of the product web 2, in one example.

Such a product web is paper printed by a high-speed printer, in one example. It may however also be other web-like articles or individual objects produced by corresponding production machinery and scanned by the camera module 1.

In FIG. 1, to simplify the illustration, only one roller 3 is shown. Fixed to this roller 3 is a shaft 4. The shaft 4 is connected to an encoder 5 which generates pulses according to the speed of rotation of the shaft 4. The pulse rate is proportional to the speed of rotation of the roller 3 and to the speed of movement of the product web 2, which is moved in the direction of feed 6.

The camera module 1 has a sensor unit 7 with a CCD and a lens. Suitable CCDs may be obtained e.g. under the trade names µPD3768 or µPD8821 from the NEC Corporation. These CCDs each have 3 lines for detecting the primary colors red, green and blue. They have 7500 or 7300 picture elements per line.

The camera module is provided with an input control element 8 which is connected to the encoder 5 and receives its pulse signals. The input control element 8 has two outputs. One of the two outputs is connected by a line 9 to the sensor unit 7, and the other output is connected to a line 10 and a signal processor 11.

Over the line 9, a control signal is sent from the input control element 8 to the sensor unit 7 to control the line frequency with which the CCD scans the product to be scanned. This control signal is a pulse sequence with the frequency of the line frequency. This pulse sequence may differ from the pulse sequence supplied by the encoder 5, since the input control element 8 is provided with a converter which converts the pulses received from the encoder 5 in a predetermined relationship, to generate the outgoing pulses to the sensor unit 7. By this means it is possible to connect the camera module according to the invention to an encoder with any desired rotation speed/pulse conversion.

The input control element 8 generates, with the aid of the pulse sequence received from the encoder 5, specific control parameters which it passes on over line 10 to the signal processor 11. These control parameters are explained in more detail below. The signal processor processes the picture signals received from the sensor unit 7 on the basis of these control parameters. The picture signals thus processed are output at an output 12 of the camera module 1.

The camera module 1 has a nominal line frequency $F_N$ by which the product web 2 may be scanned at a nominal speed $v_N$, to give an image of the product web at a predetermined nominal resolution in the direction of feed 6. The nominal line frequency is generally set at the maximum line frequency of the CCD used in the sensor unit 7. This line frequency lies typically in the range 500 Hertz (Hz) to 50 kHz.

During the normal production phase, the speed of the product web 2 generally corresponds to the nominal speed. During starting or stopping of the product web 2, the latter is gradually accelerated or decelerated. This means that the product web 2 is operated for a certain period of time at a speed below the nominal speed. In this case too, however, the product web should be scanned correctly by the camera module 1 and an image generated at the nominal resolution.

So that the nominal resolution of the generated image remains constant, and as known from conventional methods, in the event of a reduction in the speed of movement or actual speed $V_t$ as compared with the nominal speed $V_N$, the line frequency is first of all reduced in line with the reduced speed of movement detected by the encoder 5.

Figure 3:
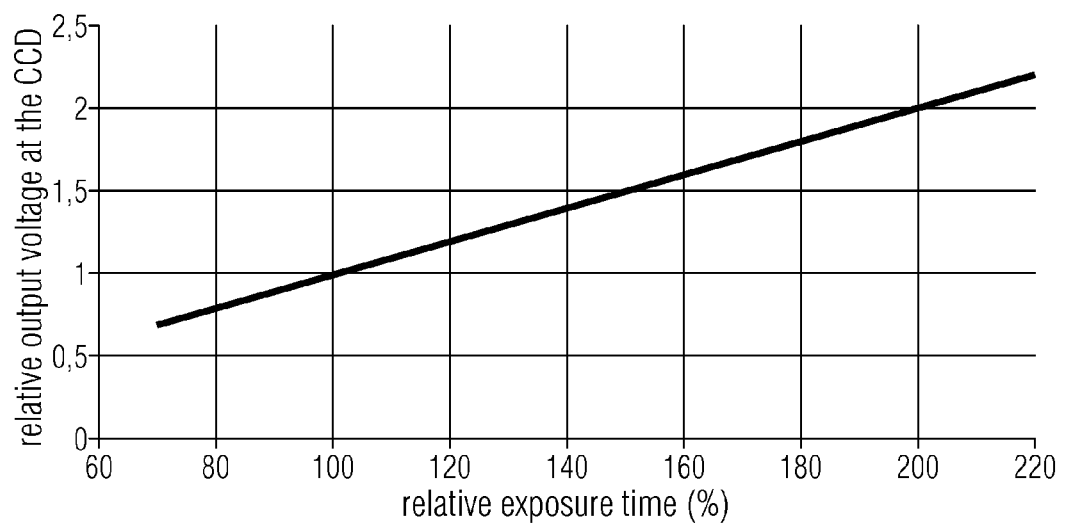
FIGS. 3-7 are coordinate system plots with graphs to explain the invention.

Since the reduction in line frequency leads to extended exposure times and integration times, the brightness of the image generated increases in proportion to the reduction in line frequency. FIG. 3 shows in a diagram the relationship between a relative integration time or exposure time and the relative output voltage of the CCD, which corresponds to the level of brightness. From this, one can see the linear rise in brightness with increasing exposure time.

Since it is basically not possible to increase brightness as desired, but instead images within a relative narrow range of brightness are desired, it is possible to compensate for speed only within a narrow range. The size of this speed range depends on the application concerned.

Figure 2:
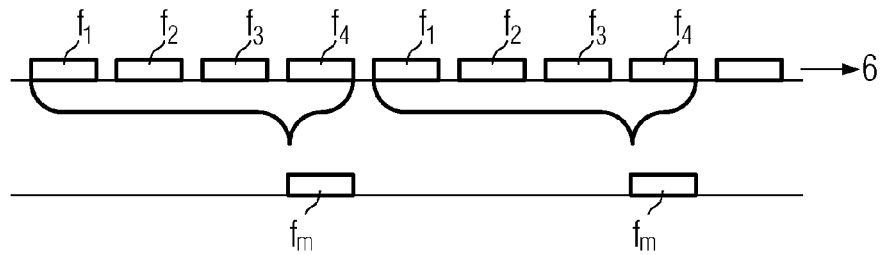
FIG. 2 is a diagram showing the principle of binning.

According to the invention, below this speed range several color values of several lines consecutive in the direction of feed 6 are in each case averaged to a single color value. The average color value $f_m$ is calculated from consecutive color values $f_i$ in the direction of feed 6 in accordance with the following formula:

$$f_m = \frac{\sum_{i=1}^{n} f_i}{n},$$

wherein n indicates the number of color values to be averaged. The averaging of several color values to give a single color value is also described as binning, and the number n of color values to be averaged as the binning factor. According to the invention, the binning factor is varied automatically on the basis of the speed of movement $V_t$ and the corresponding pulse signals from the encoder 5. FIG. 2 shows in schematic form how, through binning, in each case four color values ($f_1$-$f_4$) of image points consecutive in the direction of feed 6 are averaged to give one color value ($f_m$).

Through this automatic adjustment of line frequency, the product web 2 is scanned at constant path intervals in the direction of feed 6, irrespective of the speed of movement $V_t$. By this means the resolution in the direction of feed 6, also referred to below as the movement resolution TA, is held constant.

With an increase in the binning factor, the line frequency is increased proportionally. This means that in the event of a change in binning factor from factor 1 to factor 2, the line frequency is doubled. This increase in line frequency in turn reduces the exposure time, so that the images generated at lower speed of movement once again lie within the desired range of brightness.

From the nominal line frequency $F_N$, the binning factor n and a relative speed of movement $v_{rel}$, which is the ratio between the nominal speed $v_N$ and the speed of movement $v_t$, the current line frequency F may be calculated as follows:

$$F = F_N \cdot n \cdot V_r$$

Preferably the binning factors are in each case powers of 2 (1, 2, 4, 8, 16, etc.) so that with each increase of the binning factor by a further step, the line frequency is doubled. In prototypes of the present invention, the inventor has already realized binning factors of 128. With the FPGAs nowadays available, which use 18-bit memory words, with a color depth of 8 bits the remaining 10 bits may be used for binning factors, thus making possible a binning factor of up to 1024.

The speed ranges within which a predetermined binning factor is applied in each case are described as binning ranges.

By means of this automatic binning and adjustment of line frequency it is therefore possible for documents, such as the product web 2, to be scanned over a wide speed range, while the brightness of the image produced lies within a preset brightness range and the resolution of the image produced corresponds to the nominal resolution. It has been found that the speed of movement may be as low as desired and that reliable scanning is still possible.

Figure 4:
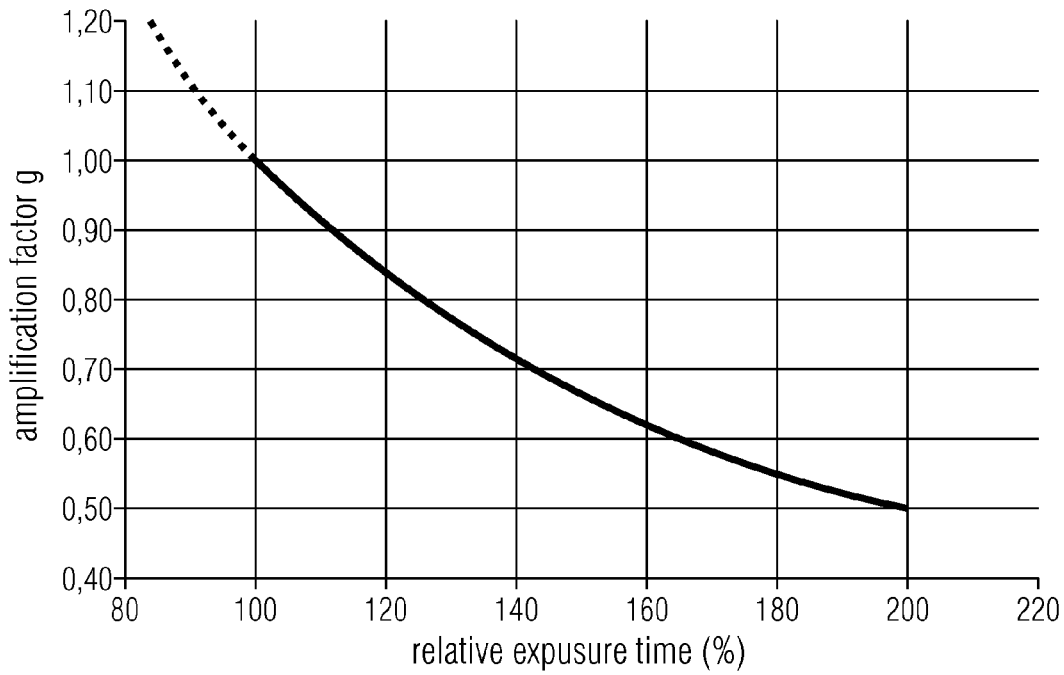
Figure 5:
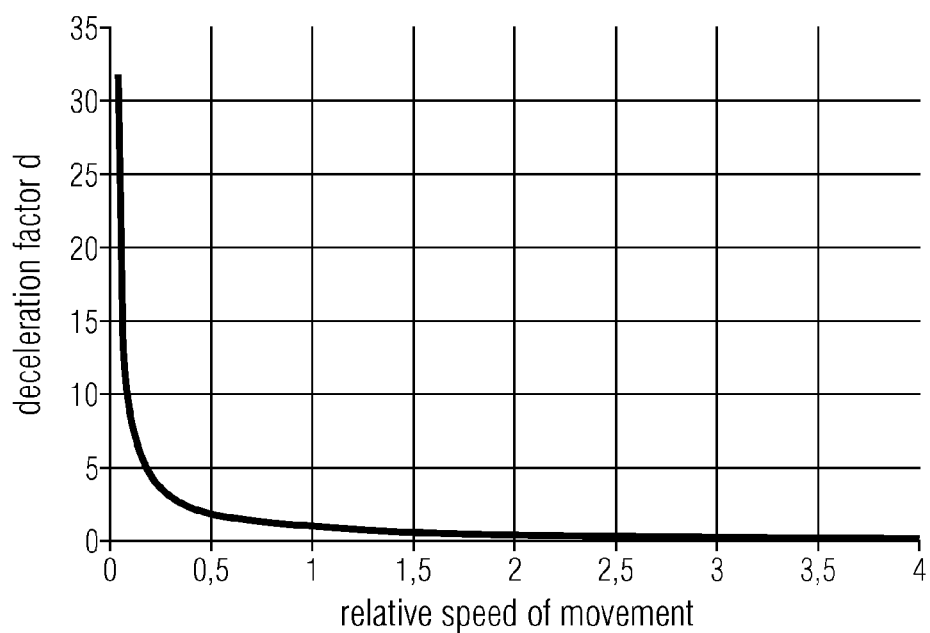

Since the brightness of the images produced varies within the individual binning ranges, in an advantageous development of the invention the picture signals generated by the sensor unit 7 are amplified, using an amplifier, by an amplification factor g. The amplification factor g is proportional to the reciprocal value of the exposure time, giving the course of the amplification factor shown in FIG. 4, in which the amplification factor is plotted over the relative exposure time of 100-200. The relative exposure time of 100 corresponds to the exposure time at nominal line frequency. The inventor has established that, in his prototypes, brightness is held constant up to twice the exposure time at nominal line frequency, without impairing image quality (graph 16 in FIG. 8). By this means it is possible in each binning range to cover a speed range covering a maximum speed of movement and a minimum speed of movement of half the maximum speed of movement. In each binning range, the amplification factor passes through the value range 1 to 0.5.

Due to the correction of the output signals by means of the amplification factor, it is possible not only to hold brightness constant over the entire speed range, i.e. over all binning ranges, but also the individual binning ranges may be made wider than if no amplification factor were used. Use of the amplification factor thus permits a further expansion of the speed range within which a document moved relative to the camera module may be scanned correctly by the camera module according to the invention.

Figure 7:
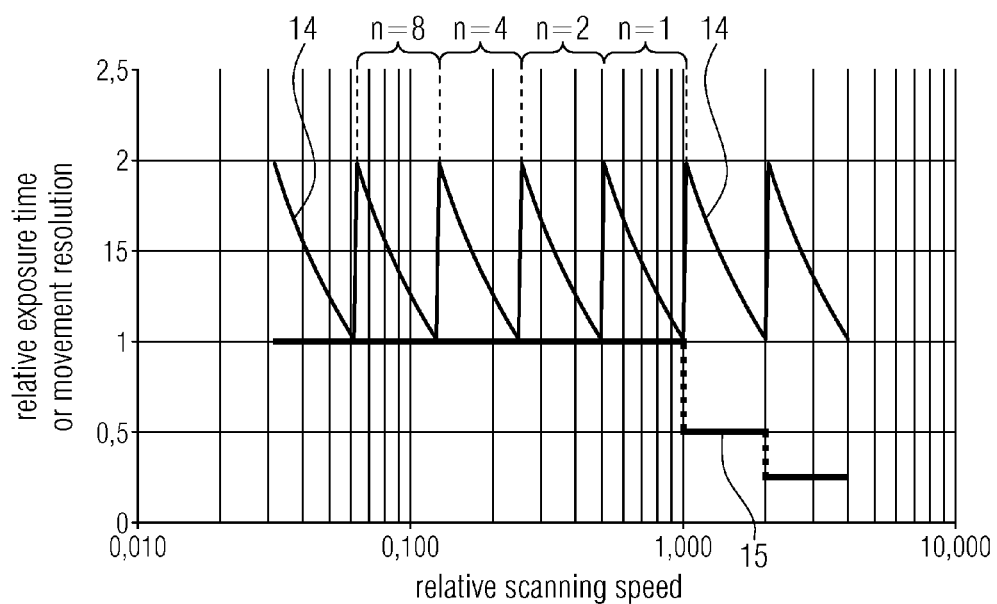

FIG. 7 shows in a diagram the course of the relative exposure time (graph 14) plotted against the relative speed of movement. The speed of movement of 1.0 corresponds to the nominal speed. When the speed of movement is reduced, the integration time and exposure time first of all increase until the binning factor n is changed from value 1 to value 2. The line frequency is then raised back up to the nominal line frequency and the exposure time is correspondingly reduced. The resolution of the generated image remains constant over the entire speed range below the nominal speed.

For easier calculation of the relevant control parameters, a deceleration factor d is introduced, this being the quotient of the nominal speed $v_N$ and the speed of movement $V_t$:

$$d = \frac{v_N}{v_t}$$

With this, the binning factor n is obtained using the following formula:

$$n = 2^{int(ld(d))}$$

in which ld is the binary logarithm to the base 2.

The amplification factor g is calculated by the following formula:

$$g = \frac{n}{d}$$

In a further advantageous variant of the invention it is possible to operate the camera module according to the invention even above the nominal speed $v_N$. In this case, though, the movement resolution of the image generated should be reduced. If the resolution were to be reduced by half, e.g. from 600 dots per inch (dpi) to 300 dpi, then the camera module may be operated at up to twice the nominal speed (graph 15 in FIG. 7). In this speed range, the scanning rate and the amplification factor should be set as in the binning ranges, with the scanning rate increasing in proportion to the feed rate. In principle the speed could be increased by any amount desired, through further reductions in the movement resolution. Because of the reduced movement resolution, this procedure is used only for short-term peaks in speed.

The camera module is preferably designed so that it emits at the output 12 a signal proportional to the movement resolution, so that automatic analyzers and a display unit are able to take account of the changed movement resolution in the analysis and presentation of the images.

The reduction of the movement resolution relative to the nominal resolution may be given by a reduction factor r, which is calculated as follows:

$$r = 2^{int(1-ld(d))}$$

The amplification factor g may be calculated, just as for binning, in accordance with the following formula:

$$g = \frac{2^{int(ld(d))}}{d} = \frac{n}{d}$$

The exposure time and integration time $t_I$ of the CCD is proportional to the product of the deceleration factor d and the reduction factor r:

$$t_I \sim d \cdot r$$

The transition between the individual movement resolution steps takes place automatically, so long as it has been cleared by the user.

It is thus possible to pass through the whole speed range above and below the nominal speed.

One possible means of using the method according to the invention even at a speed of movement below the minimum possible speed of movement and with the greatest possible binning factor involves using not every line scanned but only every $i^{th}$ line. This process is described as blanking, with i as the blanking factor. In turn, powers of preferably 2 are used as blanking factors. As an example let us assume a camera module in which the maximum binning factor n is limited to 16 and a blanking factor of 1 to 64 is used. This makes it possible to realize a speed range extending from 1/2048 of nominal speed up to nominal speed itself. At a typical nominal speed of 24 meters per second (m/s), the lowest scannable speed is 11.7 millimeters per second (mm/s). In practice even lower speeds may be realized.

Such a blanking meter is easily provided in the camera module. When using a CCD with several scan lines, such as is typically used for the detection of colored documents, the individual scan lines are offset relative to one another. This offset is corrected by an essentially known procedure in which the distance between two lines LS (line spacing) is used to calculate the correction. Since the movement resolution is changed when the nominal speed is exceeded, the correction value LS for this offset must be corrected through division by the reduction factor:

$$LS_{Kor} = \frac{LS}{r}$$

Figure 6:
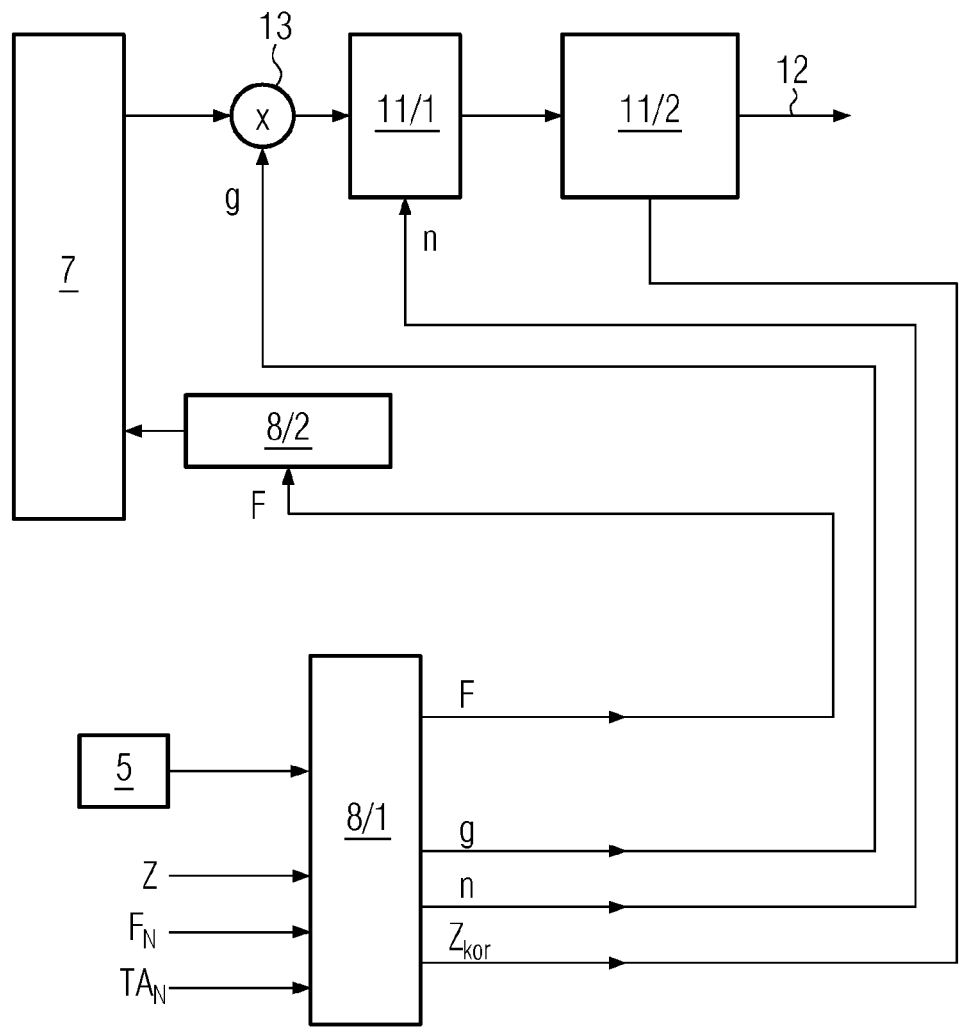

FIG. 6 shows in a simplified schematic form the circuit design of the device according to FIG. 1. Identical parts have been given the same reference numbers. The input control element 8 comprises an input element 8/1 and a pulse generator 8/2. Connected to the input side of the input element 8/1 is the encoder 5, which transmits its pulse signal to the input element 8/1. Three more signals are present at the input side, namely the distance z between adjacent scan lines in the sensor unit 7 depending on a pitch width p of the scan lines, the nominal line frequency $F_N$ and the nominal resolution in the direction of movement $T_{AN}$.

The input element 8/1 determines with the aid of pulses obtained from the encoder 5 and the nominal line frequency $F_N$ a value proportional to the line frequency F actually used. A corresponding signal F is applied at the pulse generator 8/2 and generates a pulse sequence with a frequency proportional to the signal level of F. The pulse sequence is passed on to the sensor unit 7, for suitable control of the reading-in of the individual lines.

The input element 8/1 also calculates from the pulse sequence of the encoder 5 the nominal line frequency $F_N$ and the nominal resolution $T_{AN}$, the amplification factor g and the binning factor n. The amplification factor g is passed on to an amplifier, represented in the logic circuit shown in FIG. 6 as the multiplier 13. The multiplier 13 multiplies the color values output by the sensor unit 7 by the amplification factor g. Connected to the multiplier 13 are a binning unit 11/1 and a line compensation unit 11/2, which together form the signal processor 11. The line compensation unit is needed only for the processing of colored images.

The binning unit 11/1 receives the binning factor n from the input element 8/1. The averaging of the color values received from the multiplier 13 is effected in accordance with the binning factor n.

The line compensation unit 11/2 receives from the input element 8/1 a line spacing $z_{kor}$, corrected by the reduction factor r, in accordance with which the spacing of the image points of the different scan lines within the image is corrected.

The picture signals processed in this way are output at output 12. These picture signals may be input directly to a conventional analyzer or display unit. They are no different to the picture signals of conventional camera modules. There are therefore no time-consuming image processing steps, generally involving some loss of quality, to be followed. Nevertheless, the camera module according to the invention allows the scanning of a document at a wide range of relative speeds between the document and the sensor unit. The camera module according to the invention may be realized with only minimal hardware expansion, which may be fully integrated in an FPGA with limited logic capacity.

In some applications it would be advantageous if the movement resolution could be set at a freely selectable specific value. This is however problematic when using a line camera with several parallel scan lines, since the images generated by the individual scan lines need to be superimposed and, with a change in the movement resolution, the individual images would shift relative to one another. This would lead to color defects in an overall image made up of the individual images.

In a further advantageous variant of the method according to the invention for the scanning of a document, described below, these drawbacks are overcome. This method corresponds to that of U.S. patent application Ser. No. 11/834,194, filed on Aug. 6, 2007, entitled Method and Device for Scanning a Document by Means of a Line Camera, see also German patent application DE 10 2006 036 845.2. These patent applications are incorporated herein by this reference in their entirety.

Figure 8:
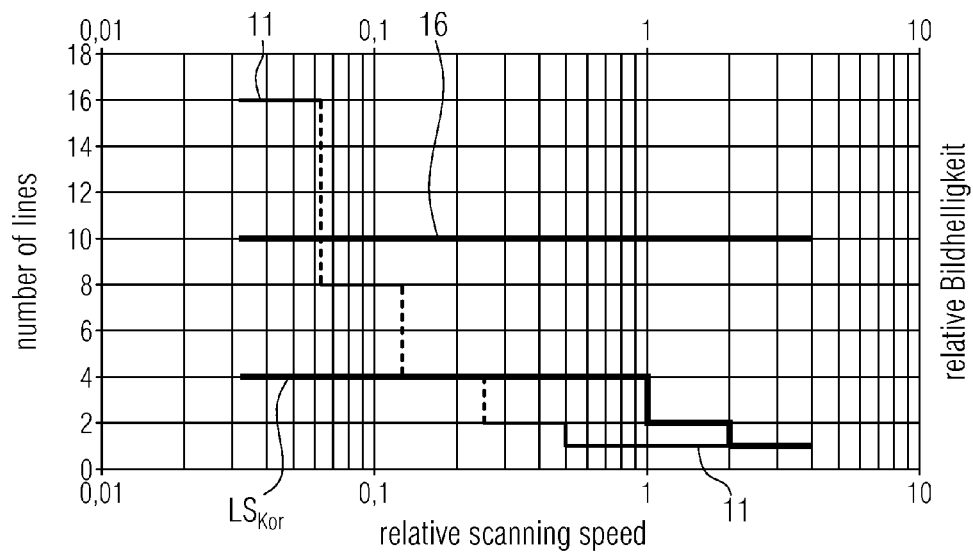
FIG. 8 shows the control unit of the camera module according to the invention in a block diagram in schematic form.

In this further development of the method according to the invention, a line camera 101 is used which has at least two parallel scan lines 102 (FIG. 8). The scan lines are typically in the form of CCDs. Such CCDs have sensor elements, usually rectangular and arranged along a straight line, which are exposed simultaneously but read serially. The sensor elements and the scan lines 102 have an average spacing s.

An image of the document 103 is formed on the scan lines 102 of the line camera 101 by means of a lens 104. In FIG. 8 the lens is shown only as an individual lens. Naturally the lens may also comprise several lenses and if necessary reflectors and apertures. With the lens, in each case small areas 105 of the document 103 are imaged on, in each case, one sensor element of the scan lines 102. These small areas represent image points 105 of the document 103. The size of an image point 105 corresponds to the size of a sensor element of one of the scan lines 102 multiplied by the scale M of the lens 104.

In the method according to the invention, the document is basically scanned at constant line frequency, lying e.g. in the range 500 Hz to 50 KHz. There is therefore a period of time $t_z$, which is the inverse value of the line frequency, between two consecutive scanning processes for the scanning in each case of one line. If it is desired to change the movement resolution, then the line frequency and with it the period of time $t_z$ need to be changed. The spacing D of the lines of the images produced depends on the speed of movement $v_t$, the period of time $t_z$ between two line scans, and the scale M, in accordance with the following formula:

$$D = \frac{v_t \cdot t_z}{M}$$

If the images generated by the line camera 101 are viewed in the image plane 106 of the line camera 101, i.e. the image points of the images have the dimensions of the individual sensor elements of the scan lines 102, then the spacing D between two adjacent lines of a particular image calculated by the above formula is applicable.

Since the two scan lines are exposed synchronously, the simultaneously generated image lines of the images generated by the two scan lines are offset relative to one another by the spacing s of the scan lines. As a result of this, the two images—viewed in the image plane 106 of the line camera 101—are offset relative to one another by the distance s. This offset Z may also be expressed in the unit of the line spacing D, giving Z=s/D. Z is a rational number with a whole-number content (integer) and a number of decimal places. Z is a scalar which applies to the two images generated by the two scan lines 102, independent of the view in the image plane 106.

The two images are brought into congruence by a two-step process. This involves the two images being displayed in the same coordinate system with the displacement caused by the offset of the scan lines of the line camera.

In the first process step, the two images are firstly shifted towards one another by the whole-number content of the offset Z, so that the displacement between the two images is minimized. The shift is therefore made against the offset. As a result, the two images are superimposed over one another in such a way that the image lines of the two images are offset from one another only by the decimal place content of Z, i.e. (Z−Int(Z)).

In principle it would also be possible, in the case of offset by a decimal place content, to take the color separation values of the nearest neighbor. The term color separation value describes the intensity of a color separation at an image point.

The use of the color separation value of the nearest neighbor would however lead to color defects in the overall image thus generated. According to the invention therefore, instead of a further shift in one of the two images, new image lines are interpolated. These are offset by the decimal place content of Z from the former image lines. This interpolation is made by interpolating the line to be interpolated from the two image lines between which the scanning line to be interpolated is located. This involves interpolation of a color separation value $f_{int}$ to be interpolated, from the color separation values of the image points—aligned in the direction of movement—of the two adjacent image lines (ZE+, ZE−), wherein the color separation value of the image point which is at a distance from the scanning line with the decimal place content of Z by the decimal place content of Z, and the color separation value of the image point which is at a distance from the scanning line to be interpolated by one minus the decimal place content of Z, is weighted by one minus the decimal place content of Z. This gives rise to the following formula for the color separation value $f_{int}$ to be interpolated:

$$f_{int} = (Z - Int(Z)) \cdot f_{ZE+} + (1 - (Z - Int(Z))) \cdot f_{ZE-}$$

With this interpolation the image lines of one of the two images are offset in such a way that the image points contained therein are positioned at exactly the same spot as the corresponding image points of the other image.

These two images brought into congruence thus provide an overall image which has no color defects on account of the bringing into congruence of the two images. This overall image may in principle be obtained with any desired speed of traverse of the line camera relative to the document to be scanned.

Figure 9:
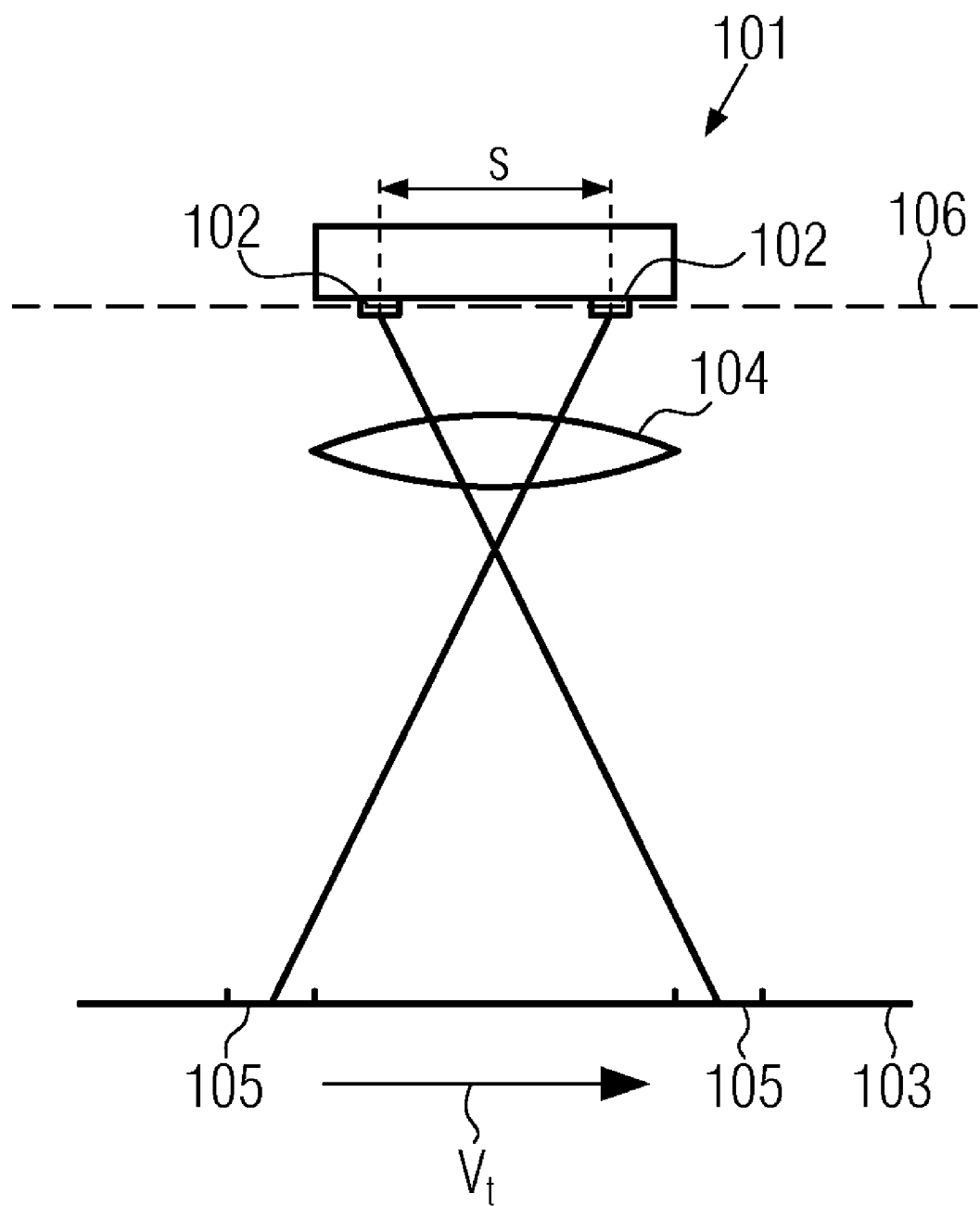
FIG. 9 is a schematic and simplified side view of a line camera with two scan lines for scanning a document.
Figure 10:
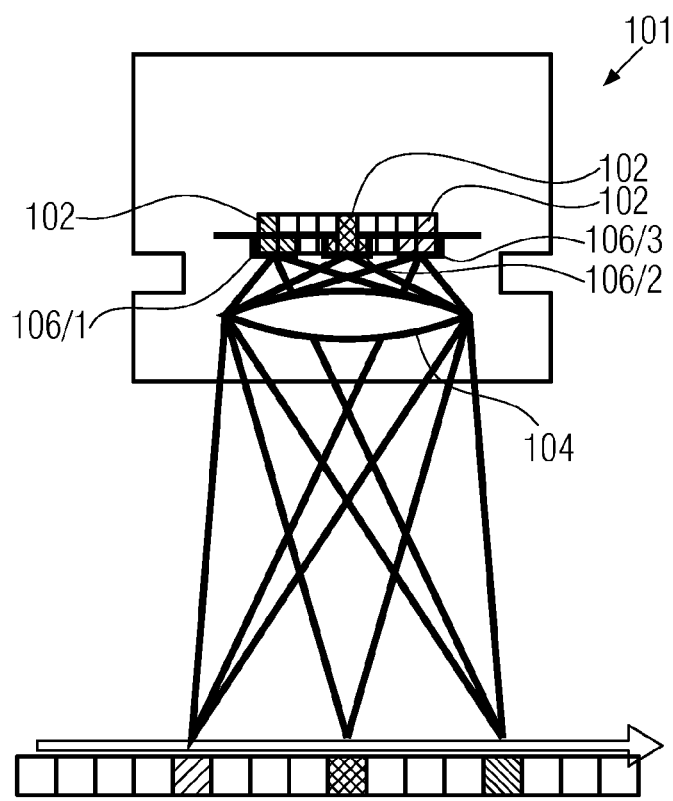
FIG. 10 is a schematic and simplified side view of a line camera with three scan lines for scanning a document.

FIG. 10 shows an embodiment of a line camera 101 with three parallel scan lines 102. Since the line camera of FIG. 10 is of similar design to the line camera of FIG. 9, identical parts bear the same reference numbers.

The three scan lines 102 are each provided with a color filter 106 for the color red 106/1, the color green 106/2 and the color blue 106/3. With these scan lines 102, a red, a green and a blue image of the document 103 is produced in each case. Such CCDs are obtainable e.g. from the NEC Corporation under the trade designations μPD3768 or μPD8821. In the μPD8821 CCD, the individual sensor elements are 10 μm (pitch width p) apart within a scan line, and the distance between two adjacent scan lines is 40 μm. The lens 104 is generally set, as far as possible, so that the document may be scanned by the line camera at 100 dpi, 150 dpi, 300 dpi or 600 dpi. This resolution in the line direction is subsequently described as the optical resolution. This optical resolution OA is as a rule clearly specified for a predetermined line camera with a predetermined lens.

The spacing s of adjacent scan lines 102 may also be represented as z=s/p, depending on the pitch width p of adjacent sensor elements of the scan lines. Usually z is a whole number. In the case of the NEC Corporation CCDs referred to above, z is in each case four. The offset Z in units of the line spacing may also be calculated as follows:

$$Z = \frac{TA \cdot z}{OA},$$

wherein the relationship between offset and speed of movement in this formula is contained in the movement resolution TA according to the following formula:

$$TA = \frac{\text{unit length [1 inch]}}{v_t \cdot t_z}$$

In practice, line frequency is set so that a specific movement resolution is obtained. The optical resolution is in practice not variable. The offset Z may therefore be determined very easily from the movement resolution TA, the optical resolution OA and z.

Figure 11:
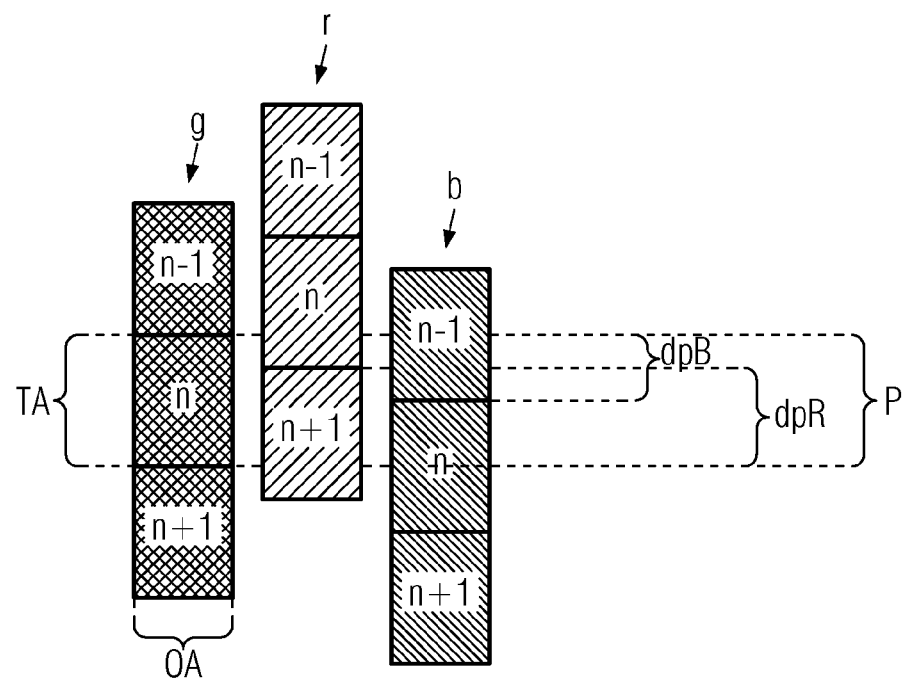
FIG. 11 shows the displacement of the image points of three different images after the first correction.

The images generated by the line camera shown in FIG. 10 are preferably brought into congruence in such a way that the red image and the blue image are each shifted and interpolated in accordance with the process described above, so that they coincide with the green image. FIG. 11 shows in simplified form in each case three image points of three adjacent lines (n−1, n, n+1) of the colors green (g), red (r) and blue (b), which are essentially located in the line direction at the same point, and are shown offset to the side only for illustrative purposes. This illustration shows the image points after shifting by the whole-number content of the line spacing Z, so that the image points of the different colors are in each case still offset only by the decimal place content of Z.

The green image points remain unchanged. The red image points represented adjacent to the green image points are shifted by dpR, which corresponds to the decimal place content of Z, to obtain a red color separation value for the position of the green image point of the line n, the two red image points of the lines n and n+1 are interpolated, wherein the image point of the line n+1 is weighted by the decimal place content of Z, and the color separation value of the line n is weighted by one minus the decimal place content of Z.

The blue image points are shifted relative to the green image points by dpB against the direction of movement. In order to obtain a blue image point at the position of the green image point n, the color separation values of the image points of lines n−1 and n are interpolated, with the color separation value of the image point of the line n−1 being weighted by the decimal place content of Z, and the color separation value of the image point of line n by one minus the decimal place content of Z.

Since the human eye is very much more receptive to the color green than to the colors red and blue, it is expedient to leave the green image unchanged. As a result, the image will be perceived much more sharply by the human eye than if the red or blue image were to be left unchanged and the green image similarly interpolated.

The embodiments of the invention may be summarized briefly as follows:

The invention relates to a method and a device for the optical scanning of a document by means of a line camera.

In the method according to the invention the document may be scanned at variable speed. Since on the one hand a line frequency at which the individual lines may be scanned is set according to the speed of movement, and on the other hand binning takes place automatically on the basis of the speed of movement, with the line frequency being multiplied by a binning factor n, it is possible in a very simple manner to scan a document over a wide speed range. Correction of the color values is effected preferably by means of an amplification factor, so that the brightness of the images generated by this means is constant over the entire speed range.

| Reference Numbers: | |
|---|---|
| 1 | camera module |
| 2 | product web |
| 3 | rollers |
| 4 | shaft |
| 5 | encoder |
| 6 | direction of feed |
| 7 | sensor unit |
| 8 | input control element |
| 8/1 | input element |
| 8/2 | pulse generator |
| 9 | line |
| 10 | line |
| 11 | signal processor |
| 11/1 | binning unit |
| 11/2 | line compensation unit |
| 12 | output |
| 13 | multiplier |
| 14 | graph |
| 15 | graph |
| 16 | graph |
| 101 | line camera |
| 102 | scan line |
| 103 | document |
| 104 | lens |
| 105 | image point |
| 106 | image plane |

While this invention has been particularly shown and described with references to preferred embodiments thereof, it will be understood by those skilled in the art that various changes in form and details may be made therein without departing from the scope of the invention encompassed by the appended claims.

What is claimed is:

1. Method for the optical scanning of a document with a line camera, the method comprising: moving the line camera during scanning relative to the document at a speed of movement, wherein during scanning at a predetermined nominal speed and a predetermined nominal line frequency an output image with a nominal resolution is generated, and that the scanning of the document is effected at a variable speed of movement wherein a line frequency at which individual lines are scanned is changed in proportion to the speed of movement and when the speed of movement is reduced by a predetermined amount relative to the nominal speed, color values of several lines are averaged to give one color value and the line frequency is proportional to a product of speed of movement and a number of color values to be averaged, wherein depending on the speed of movement, the number of color values to be averaged is changed automatically.

2. Method according to claim 1, wherein the color values are amplified by an amplification factor which is indirectly proportional to the speed of movement for a speed range in which a specific number of color values are averaged, wherein this number is described as a binning factor.

3. Method according to claim 2, wherein the amplification factor is proportional to a ratio between the speed of movement and the nominal speed multiplied by the binning factor.

4. Method according to claim 3, wherein the number of color values to be averaged in each case is a power of 2.

5. Method according to claim 4, wherein the number of color values to be averaged extends over a range of 1-32, or 1-128 or 1-1024.

6. Method according to claim 5, wherein the line frequency lies in a range of 500 Hz to 50 KHz.

7. Method according to claim 6, wherein the document is scanned at a speed of movement greater than the nominal speed, while the resolution of images produced is reduced in a direction of movement.

8. Method according to claim 7, wherein, as the speed of movement is increased, the resolution is reduced in steps, and in the separate resolution reduction steps the line frequency is changed in proportion to the speed of movement.

9. Method according to claim 7, wherein during scanning by a CCD with several scan lines, on account of an offset of the scan lines, a correction of a spacing between two lines is made, wherein this line spacing is divided by a reduction factor.

10. Method according to claim 9, wherein in a further reduction of speed of movement, only each $i^{th}$ scanned line is used.

11. Method according to claim 10, wherein with increased reduction in the speed of movement, a number i is increased step by step, and in the separate steps the line frequency is changed in proportion to the speed of movement.

12. Method according to claim 11, wherein for i, only powers of 2 are used.

13. Method according to claim 12, wherein the line camera has at least two parallel scan lines arranged at a distance s from one another, and a lens with an image scale M,
wherein the following steps are taken:
line-by-line scanning of the document by the line camera, wherein by means of each scan line a separate image of the document is produced, these images being offset from one another according to the distance s between the scan lines, and divided into a multiplicity of lines, wherein a distance D between two adjacent lines of an image in an image plane of the line camera amounts to $$D = \frac{v_t \cdot t_z}{M}$$

wherein $v_t$ is a speed at which the line camera is moved relative to an object, and $t_z$ is a period of time between two consecutive exposures by one of the scan lines,
so that an offset Z of the images in a unit of the line spacing D results in Z=s/D,
bringing into congruence of the images by shifting at least one of the images relative to the other image by Int(Z) lines to reduce the offset, and interpolation of one of the images with lines offset by (Z-Int(Z)).

14. Method according to claim 13, wherein the line camera has more than two scan lines, each of which produces an image, wherein all images are brought into congruence.

15. Method according to claim 14, wherein the scan lines are designed to detect different colors.

16. Method according to claim 15, wherein one of the scan lines is designed to detect a specific color, and that the images generated by the other scan lines are interpolated so as to be brought into congruence with the image of the specific color.

17. Method according to claim 16, wherein the specific color is green.

18. Method according to claim 17, wherein during interpolation in each case two color separation values of adjacent image lines are interpolated with one another, wherein one of the two color separation values is weighted by a decimal place content of Z, and the other color separation value is weighted by one minus the decimal place content of Z.

19. Method according to claim 18, wherein the method is executed line by line, i.e. that when one or two image lines of each image are produced, they are brought into congruence with corresponding image lines of the other images.

20. Method according to claim 19, wherein the offset Z is calculated on the basis of an optical resolution of a system comprising line camera and lens in a line direction, a movement resolution dependent on speed and by which the line camera is moved relative to the object, and a number z which is a distance between two adjacent scan lines of the line camera in units of a pitch width of adjacent sensor elements of a scan line.

21. Method according to claim 1, wherein the number of color values to be averaged in each case is a power of 2.

22. Method according to claim 1, wherein the number of color values to be averaged extends over a range of 1-32, or 1-128 or 1-1024.

23. Method according to claim 1, wherein the line frequency lies in a range of 500 Hz to 50 KHz.

24. Method according to claim 1, wherein the document is scanned at a speed of movement greater than the nominal speed, while in this case the resolution of the images produced is reduced in a direction of movement.

25. Method according to claim 24, wherein, as the speed of movement is increased, the resolution is reduced in steps, and in the separate resolution reduction steps the line frequency is changed in proportion to the speed of movement.

26. Method according to claim 24, wherein during scanning by a CCD with several scan lines, on account of an offset of the scan lines, a correction of the spacing between two lines is made, wherein this line spacing is divided by a reduction factor.

27. Method according to claim 1, wherein in a further reduction of speed of movement, only each $i^{th}$ scanned line is used.

28. Method according to claim 27, wherein with increased reduction in the speed of movement, a number i is increased step by step, and in the separate steps the line frequency is changed in proportion to the speed of movement.

29. Method according to claim 27, wherein for i, only powers of 2 are used.

30. Method according to claim 1,
wherein the line camera has at least two parallel scan lines arranged at a distance s from one another, and a lens with an image scale M,
wherein the following steps are taken:
line-by-line scanning of the document by the line camera, wherein by means of each scan line a separate image of the document is produced, these images being offset from one another according to the distance s between the scan lines, and divided into a multiplicity of lines, wherein a distance D between two adjacent lines of an image in an image plane of the line camera amounts to $$D = \frac{v_t \cdot t_z}{M}$$

wherein $v_t$ is the speed at which the line camera is moved relative to the object, and $t_z$ is a period of time between two consecutive exposures by one of the scan lines,
so that an offset Z of the images in a unit of the line spacing D results in Z=s/D,
bringing into congruence of the images by shifting at least one of the images relative to the other image by Int(Z) lines to reduce the offset, and interpolation of one of the images with lines offset by (Z−Int(Z)).

31. Method according to claim 30, wherein the line camera has more than two scan lines, each of which produces an image, wherein all images are brought into congruence.

32. Method according to claim 30, wherein the scan lines are designed to detect different colors.

33. Method according to claim 32, wherein one of the scan lines is designed to detect a specific color, and that the images generated by the other scan lines are interpolated so as to be brought into congruence with the image of the specific color.

34. Method according to claim 33, wherein the specific color is green.

35. Method according to claim 34, wherein during interpolation in each case two color separation values of adjacent image lines are interpolated with one another, wherein one of the two color separation values is weighted by a decimal place content of Z, and the other color separation value is weighted by one minus the decimal place content of Z.

36. Method according to any of claim 30, wherein the method is executed line by line, i.e. that when one or two image lines of each image are produced, they are brought into congruence with a corresponding image lines of the other images.

37. Method according to claim 30, wherein the offset Z is calculated on the basis of an optical resolution of a system comprising line camera and lens in the line direction, a movement resolution dependent on speed and by which the line camera is moved relative to the document, and a number z which gives a distance between two adjacent scan lines of the line camera in units of a pitch width of adjacent sensor elements of a scan line.

38. Device for the optical scanning, comprising:
a sensor unit including a line camera with a CCD and a lens;
an input control element with an input for the connection of an encoder by which a relative speed between the line camera and a document to be scanned is detected; and
a signal processor, wherein the input control element and the signal processor execute the method for optical scanning of a document by means of a line camera which, during scanning, is moved relative to the document at a speed of movement, wherein during scanning at a predetermined nominal speed and a predetermined nominal line frequency an image with a nominal resolution is generated, and that the scanning of the document is effected at a variable speed of movement wherein a line frequency at which in each case individual lines are scanned is changed in proportion to the speed of movement and that when the speed of movement is reduced by a predetermined amount relative to the nominal speed, color values of several lines are in each case averaged to give one color value (binning) and the line frequency is proportional to a product of speed of movement and a number of color values to be averaged, so that even at reduced speed an image with nominal resolution is generated, wherein depending on the speed of movement, the number of color values to be averaged in each case is changed automatically.

39. Device according to claim 38, wherein the input control element and the signal processor are formed by an FPGA.

40. Device according to claim 39, wherein the device is a camera module which may be retrofitted to an existing scanning system.

41. Device according to claim 38, wherein the device is a camera module which may be retrofitted to an existing scanning system.

* * * * *